Figure 3:
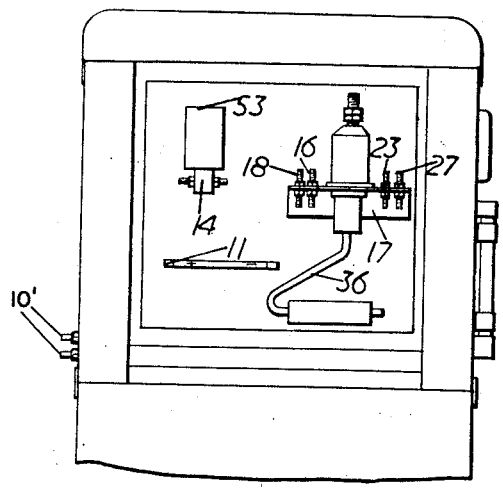

Aug. 28, 1962   E. T. HALL ET AL   3,051,827
GAS SHIELDED ARC WELDING
Filed Nov. 10, 1959                    2 Sheets-Sheet 1

Inventors
ERIC THOMAS HALL
WILLIAM REGINALD LEONARD
By
Cushman, Darby & Cushman
Attorneys Inventors
ERIC THOMAS HALL
WILLIAM REGINALD LEONARD
By
Cushman, Darby & Cushman
Attorneys United States Patent Office 3,051,827
Patented Aug. 28, 1962

3,051,827
GAS SHIELDED ARC WELDING
Eric Thomas Hall, Derby, and William Reginald Leonard, Birstall, England, assignors to Rolls-Royce Limited, Derby, England, a company of Great Britain
Filed Nov. 10, 1959, Ser. No. 852,041
Claims priority, application Great Britain Nov. 21, 1958
5 Claims. (Cl. 219—130)

This invention concerns improvements in and relating to gas shielded arc welding.

According to the invention, a gas shielded arc welding apparatus comprises a gas conduit opposite ends of which are respectively adapted to be connected to a source of gas and to a welding torch, a valve in said conduit for controlling gas flow therethrough, an electrical open circuit which is adapted to have a welding torch electrode and work pieces connected across it, first switch means for connecting the open circuit to a source of electrical supply to that the open circuit is supplied with current at welding voltage for welding said workpieces, means for providing an ionising current, said means being connectible to the open circuit by second switch means, and automatic sequence control means which are manually settable to one condition in which the valve is first opened so as to permit gas flow through the conduit, then, after a delay, the first and second switch means are closed so that welding and ionising current is supplied to the open circuit, and thereafter, when an arc has been established between the torch electrode and workpieces, the second switch means is opened so as to switch off the ionising current, the control means being manually settable to another condition in which the first switch means is opened so as to switch off the welding current and subsequently, after a delay, the valve is closed so as to stop gas flow through the conduit.

Thus the complete welding cycle may be initiated and finished from a finger-operated press switch which may, for example, be located on the welding torch.

Preferably the apparatus comprises a current control unit adapted, on the striking of the arc, to effect a smooth rise in welding current from a minimum to a predetermined value at a predetermined speed and adapted, on the opening of the first switch means and prior to the cutting off of the welding current, to cause the welding current to fall smoothly to a predetermined minimum at a predetermined speed.

The smooth rise and fall of current effected by the current control unit assists in preventing the formation of a crater.

The apparatus preferably also comprises a pair of conduits which are respectively for the supply and withdrawal from the welding torch of a cooling liquid (e.g. water), the liquid supply conduit being provided with a valve for controlling liquid flow therethrough, the said valve being opened and closed simultaneously with the opening and closing of the valve in the gas conduit.

A secong gas conduit may be provided for the supply of gas to a weld backing member, the second gas conduit having a valve therein, for controlling gas flow therethrough, which is opened and closed simultaneously with the valve in the first gas conduit. Means may be provided for maintaining the valve in the second gas conduit closed while that in the first gas conduit is open.

The said second switch means preferably comprises a voltage sensitive, normally open relay which is connected to the open circuit, the relay being such that when the first switch means is closed and the open circuit is on open circuit voltage the relay is closed so as to switch in the means for providing ionising current and, when the arc is established and the voltage in the circuit drops accordingly, the relay is opened so as to switch out the means for providing ionising current.

The said apparatus, having any or all the features listed above, is preferably housed within a single housing so as to form a self contained unit. Thus the apparatus can be used merely by connecting the said unit, on the one hand, to supplies of electricity, shielding gas and cooling liquid and, on the other hand, to a welding torch. This substantially reduces the number of separate components normally employed in welding plant and therefore enables the welding plant to be very readily set up and dismantled.

The invention also includes within its scope a method of arc welding by means of a gas shielded welding arc comprising supplying a welding torch with gas so as to form a gas shield, then, after a delay supplying welding and ionising current to the torch electrode so as to establish an arc between the electrode and workpieces to be welded without establishing physical contact between the electrode and workpieces, switching off the ionising current on the formation of the arc, switching off the welding current at the completion of the weld, and subsequently after a delay, switching off the gas supply to the torch.

Preferably the electrode is a non-consumable electrode such, for example, as tungsten, which acts as a cathode for striking the arc. The gas employed is preferably argon.

Figure 1:
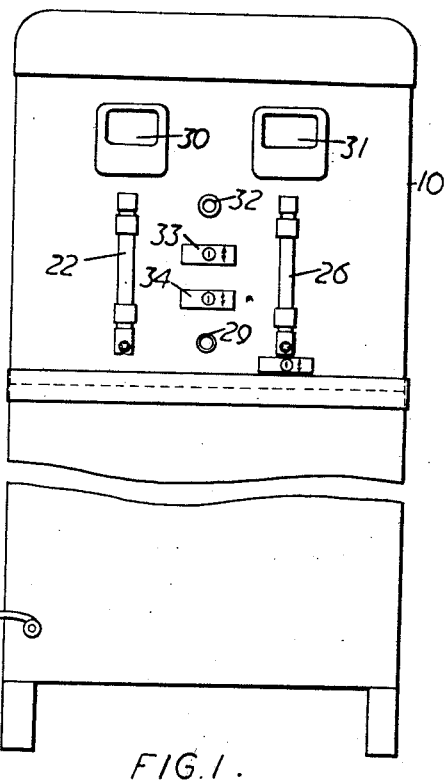
Figure 2:
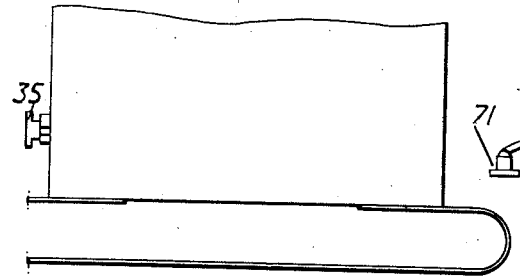
Figure 4:
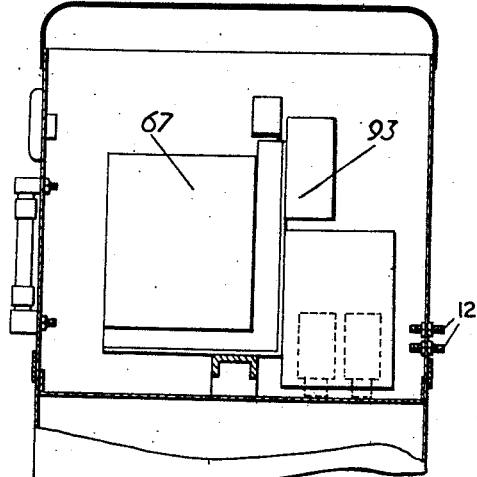
Figures 5, 6:
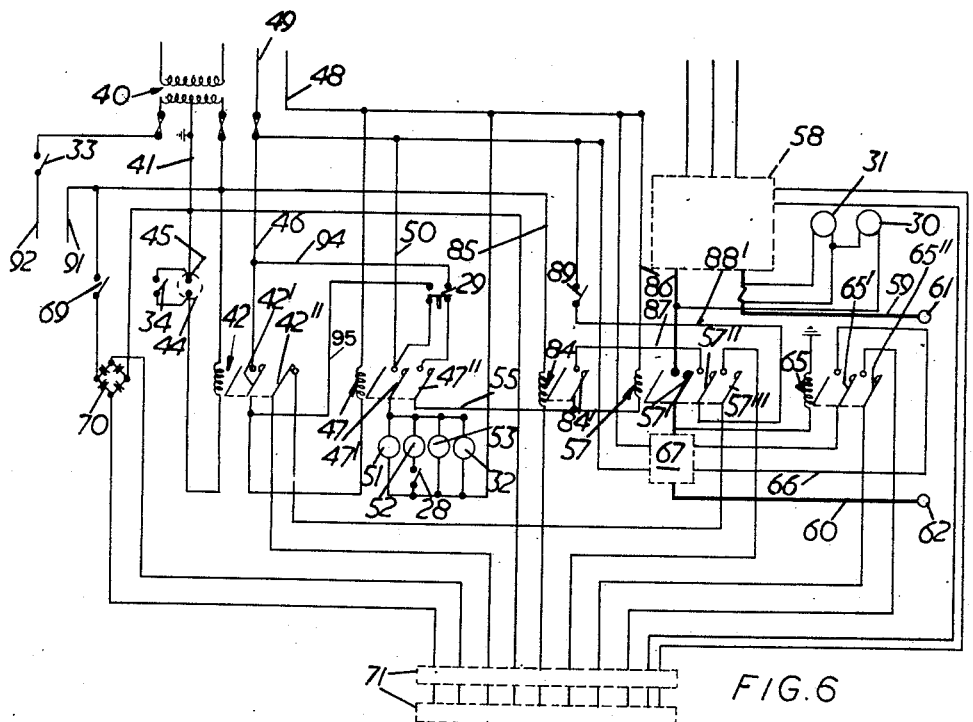

The invention is illustrated, merely by way of example, in the accompanying drawings in which:

FIGURE 1 is a diagrammatic front elevation of a welding apparatus according to the invention, FIGURE 2 is a plan of the apparatus, FIGURES 3 and 4 are diagrammatic left and right side elevations of the apparatus, FIGURE 5 is a schematic diagram of the argon and water circuits of the apparatus, and FIGURE 6 is an electrical circuit diagram of the apparatus.

Referring to the drawings, the welding apparatus comprises a cabinet 10 on one side of which is secured a bracket 11 (FIG. 3) for a welding torch assembly. This assembly is not shown in the drawings but the welding torch may be of any construction suitable for use in argon weldng, the torch having a non-consumable electrode such, for example, as tungsten, which acts as a cathode for striking the arc, and the torch having conduits internally thereof for the passage therethrough of water or other cooling liquid. The cabinet 10 would normally be mounted alongside a work bench (not shown).

The cabinet 10 is provided at its rear with two vertically spaced-apart connections 10' (FIG. 3) for the argon lines to the torch and to a backing member (not shown) respectively and with two vertically spaced-apart connections 12 (FIG. 4) for the inlet and outlet respectively of cooling water. The inlet water flows along a line 13 (FIG. 5), controlled by a solenoid valve 14, via a watertight compartment 15 (FIG. 2) to a terminal 16 mounted on a bracket 17 (FIG. 3) disposed on one side of the cabinet 10. The outlet water is returned from a terminal 18 on the bracket 17 and to one of the FIGURE 4 connections 12 via a line 19 (FIG. 5). The argon supply to the torch flows along a line 20, controlled by a solenoid valve 21, and via a flow gauge 22 which is disposed at the front of the cabinet to a terminal 23 on the bracket 17. The argon supply to the backing member flows along a line 24, controlled by a solenoid valve 25, and via a flow gauge 26 at the front of the cabinet to a terminal 27 on the bracket 17.

The argon to the backing member may be switched off by way of a switch 28 (FIG. 6). Purging of the argon lines may be effected by depression of a push button switch 29 as described in greater detail below.

The front (FIG. 1) of the cabinet 10 is provided with a voltmeter 30 and an ammeter 31 for measuring the welding current, an indicator lamp 32 for indicating when argon and water are being supplied to the torch, a switch 33 by means of which a filler wire feed unit and/or a welding torch carriage unit (not shown) may be switched on and off, and a "weld sequence" switch 34 by means of which the welding sequence may be started and stopped. At the rear of the cabinet 10 is a T.R.S. cable gland 35 (FIG. 3) by means of which the apparatus may be connected to a 420 volt, 3 phase, mains supply, the power supply to the torch being by way of a line 36.

The electrical circuit of the welding apparatus is shown in FIGURE 6. This circuit comprises a transformer 40 whose primary winding is given a 420 volt supply from two lines of the three line mains input.

Connected between an earthed centre tapping and one end (right) of the 55–0–55 volt secondary winding of the transformer 40 is a circuit 41 including the coil of a relay 42 which circuit will be closed on the closing of the "weld sequence" switch 34 or, alternatively, on the insertion of a plug 44 into a two-pin socket 45, the plug 44 being provided for the remote control by hand of the complete welding sequence when using the hand welding torch. The relay 42 has a normally open contactor 42′ and a normally closed contactor 42″ and, on the closing of the contactor 42′, the circuit 46, which includes the coil of a relay 47, will be completed, the circuit 46 including lines 48, 49 which are given a 230 volt supply by being connected across one phase —line to start point— of a welding transformer/rectifier unit 58.

The relay 47 has two, normally open contactors 47′, 47″ and the closing of the contactor 47′ on energisation of the relay 47, will complete a circuit 50 across which are arranged in parallel a pair of solenoids 51, 52 (which control the valves 21, 25 in the argon lines 20, 24 to the torch and backing member respectively) a solenoid 53 (which controls the valve 14 in the water line 13), and the indicator lamp 32. It is not, of course, always necessary to use argon at the back of a weld. The single pole switch 28 is therefore provided to enable the solenoid 52 to be switched off on such occasions so as to prevent argon wastage.

The positions in the cabinet 10 of the solenoids 51, 52, and 53 are clearly shown in FIGURE 2.

From 0–3 seconds (according to choice) after the closing of the contactor 47′, the contactor 47″ closes so as to connect a conductor 55 to the circuit 50 via the push button switch 29. The conductor 55 is connected to the line 48 via the coil of a main welding contactor relay 57, the relay 57 having normally open contactors 57′, 57″, 57‴.

The welding transformer/rectifier unit 58, which incorporates a magnetic amplifier, is provided with the 420 volt, 3-phase mains input and is connected via lines 59, 60 to positive and negative terminals 61, 62 respectively, which are to be connected to the torch assembly, the line 60 including the contactor 57′. Closing of the contactor 57′ will make available at the terminals 61, 62 a supply at about 64 volts D.C. which is read by the ammeter 31 and the voltmeter 30.

The coil of a voltage sensitive, relay 65 having normally open contactors 65′, 65″ is connected between the line 60 and earth. On closing of the contactor 57′, the 64 volt D.C. supply will therefore be applied across the relay 65 whose starter contactor 65′ will therefore close the control circuit 66 of a high frequency unit 67.

The high frequency unit 67 is energised from lines 48, 49 and its position in the apparatus is clearly shown in FIGURE 4. The unit 67 may be of known kind comprising a high voltage, low power, transformer, a spark gap and an oscillatory circuit comprising a high voltage capacitor and an inductance, and is arranged to induce a high frequency current in the line 60. High frequency ionising currents generated in the said oscillatory circuit are superposed on the welding current so that when the welding torch is held near an earthed workpiece the main welding arc is automatically established or started without it being necessary for the welding electrode to contact the workpiece.

The high frequency ionising current thus induced into the line 60 causes the welding arc to strike as a result of which the welding voltage will fall from 64 volts to 10 volts. The latter voltage is insufficient to maintain the voltage sensitive relay 65 closed and on the opening of the relay 65 the high frequency ionising current is cut off.

A current control unit 68 is connected across the secondary winding of the transformer 40 by way of a switch 69, a metal rectifier unit 70, and a plug and socket device 71, the device 71 being arranged at the front of the cabinet 10. The switch 69 may thus be opened or closed to switch the current control unit in or out.

The current control unit 68 comprises a variable resistance 72 (e.g. a 75 ohm resistance) which is mechanically coupled, schematically shown, to the armature 73 of a D.C. motor. The resistance 72 controls a magnetic amplifier unit (not shown) which forms part of the unit 58. Accordingly control of the resistance 72 by the said D.C. motor controls the welding current.

The armature 73 is disposed in a circuit containing a variable (e.g. a 100 ohm) resistance 74, a shunt field 75, "lower" contacts 76′, 76″, 76‴ for lowering the current, and "raise" contacts 77′, 77″, 77‴ for raising the current. The coil 77 of the "raise" relay is disposed in a circuit including normally closed micro-switches 78, 80, which serve respectively as a current setting switch, and an upper limit switch. Switch 78 is preferably adjustable and permits the welding current to rise to a pre-set value, which is more than a minimum operating value controlled by normally open switch 99 but less than a maximum permissible value controlled by switch 80, before the switch 78 opens. Normally closed contacts 76⁗ are interlocking contacts operated by coil 76. The coil 76 of the "lower" relay is disposed in a circuit including normally closed contacts 77⁗ which are interlocking contacts operated by coil 77. The circuit including the "raise" coil 77 is provided with a retaining or holding contact 82 which closes and opens respectively with the energising and de-energising of coil 77, whilst the circuit including the "lower" coil 76 includes a retaining contact 83 which is normally disconnected, i.e., not used.

The initial closing of the relay 65 closes the contactor 65″ and this energises the coil 77 of the "raise" relay. The coil 77 is maintained energised after the striking of the arc and consequent opening of the contactor 65″, by the internal retaining contact 82 which operates (remains closed) until the welding current reaches a predetermined value. At this point the current setting, normally closed, micro-switch 78 automatically breaks the circuit, deenergising "raise" coil 77 and opening contact 82. In reaching the said predetermined value, the welding current rises smoothly at a predetermined rate which may be varied by the variable resistance 74.

Welding may now continue at the pre-set current and can be varied by hand if necessary.

To complete the welding cycle, the switch 34, or the remote control via plug 44 is opened. This breaks the circuit of relay 42 the opening of whose contactor 42′ breaks the supply to the relay 47. The contactor 42″ closes and a circuit including the contactor 57‴ (which will then be closed) and the coil 76 of the "lower" relay will be completed by the resultant bridging of contact 83. The D.C. motor will then adjust the resistance 72 as a result of which the welding current will therefore begin to decay slowly and smoothly at a predetermined rate. Such decay may be arranged to take approximately 3–8 seconds although, of course, this timing may be varied by adjustment of the variable resistance 74.

The contactor 47' of the relay 47 is held closed by means later explained (and hence the solenoids 51—3 remain energised) for 7–20 seconds after opening (de-energization) of the relay 47 so that argon coverage is given to the weld and water is supplied for cooling the welding torch for a period after the welding current is switched off.

The opening of the contactor 47", on the opening of the relay 47, does not however immediately break the current supply of the relay 57. This is because a normally open relay 84, which is disposed in a retaining circuit 85 connected between a centre tapping of the secondary winding of the transformer 40 and one end thereof, has a normally open contactor 84' so disposed that when the relay 84 is closed (which occurs after the closing of the relay 65, i.e., when normally open microswitch 90 closes due to weld current in line 60 increasing to the predetermined lower limit thereof) there will be a circuit which will be supplied with current from the lines 48, 49, the said circuit comprising conductor 86, the coil of relay 57, contactor 84', conductor 87, contactor 57", conductor 88' and switch 89.

The welding current, however, is at this time being reduced by the current control unit 68 and when it has reached a minimum predetermined value, a "lower limit" micro-switch 90 disposed in the circuit 85 is operated (opened) with the result that the relay coil 84 is de-energized. The supply to the welding contactor relay coil 57 is therefore also broken with consequent opening of the contactors 57' and 57''' whereby the welding current is cut off and the circuit including the "lower" relay 76 is broken. This completes automatic control of the welding cycle.

There is connected across the secondary winding of the transformer 40 a circuit including lines 91, 92 which provide an 110 volt supply to a filler wire feed unit and/or a welding torch carriage unit (not shown). The line 92 includes the single pole switch 33 for switching off these units.

If it is desired to employ hand control, the switches 69, 89 (which together may constitute one double pole switch) are switched off with the result that the current supply to the current control unit 68 and to the retaining circuit 85 of the relay 57 is broken.

In such a case, switch 34 is closed as before, or the remote control via plug 44 is inserted, with the result that relay 42 and thereafter relay 47 close as described above with consequent energisation of the argon and water solenoids 51—3 and lighting of the lamp 32. After a time which can be varied from 0 to 3 seconds the contactor 47" closes with consequent closing of the relay 57. The open-circuit welding voltage closes the relay 65 and the high frequency derived from the unit 67 initiates a welding arc at the predetermined current, upon which the relay 65 opens.

The current control resistance 72 is set by hand to the required value so that the welding current remains constant throughout the complete welding sequence unless it is altered by manual adjustment of the resistance 72.

At the end of the welding sequence, the switch 34, or the remote control via plug 44, is switched off and the relays 42, 47, 57 open one after the other in that order. Since the retaining circuit 85 is broken, the relay 57 will open when the contactor 47" opens.

The push button switch 29 is provided to make possible the pre-purging of the argon lines 20, 24, an advantageous feature for example in the case when the purging time period, effected automatically during the initial operation described above, between the closing of contactor 47' and the contactor 47" would not be long enough to achieve satisfactory purging, for example when a backing member for a workpiece encloses a large volume for the gas. When the push button switch 29 is depressed, contact is established between conductors 94, 95 which are connected to the circuit 46. The coil of the relay 47 is therefore energised, with consequent energisation of the solenoids 51—3 and lighting of the indicator lamp 32. On release of the push button switch 29, the relay 47 opens but the supply to the solenoids 51—3 and lamp 32 is maintained for the same period (which may be varied between 7 and 20 seconds) as is predetermined for argon coverage after completion of a weld.

As stated above, the contactor 47" is arranged to close from 0–3 seconds after the closing of the contactor 47', while the contactor 47' is arranged to be held closed for a period of 7–20 seconds after the opening of the relay 47. These delay periods are effected by means of a mechanical timer 93 mounted at the side of the apparatus.

We claim:

1. A gas shielded arc welding apparatus comprising an electrical power supply circuit adapted to supply a welding current, at least one gas supply conduit for feeding gas to the vicinity of a weld, a valve in said conduit controlling the flow of gas therethrough, first relay means, first and second contactors controlled by said first relay means, a solenoid controlling said valve and connected in circuit with said first contactor so that closure of the latter by said first relay means energises the solenoid to open said valve, second relay means connected in circuit with said second contactor so that closure of the latter by said first relay means energises the second relay means, a main contactor which is connected in said electrical power supply circuit and which is closed by said second relay means when the latter is energised, a "raise" circuit which is completed when said second relay means is energised and a welding arc has been struck for increasing the welding current supplied by said electrical power supply circuit to a predetermined value, a retaining circuit for maintaining the second relay means energised whilst the welding current remains above a predetermined minimum value, a "lower" circuit which is completed when said second relay means is maintained energised by said retaining circuit and said first relay means is de-energised, for reducing the welding current to said predetermined minimum value, and timing means operatively associated with said first and second contactors and serving to ensure that said second contactor opens after said first contactor when said first relay means is energised, and that said first contactor closes after said second contactor and after the welding current has been reduced to said predetermined minimum value, when said first relay means is de-energised.

2. A gas shielded arc welding apparatus comprising an electrical power supply circuit adapted to supply a welding current, at least one gas supply conduit for feeding gas to the vicinity of a weld, a valve in said conduit controlling the flow of gas therethrough, first relay means, first and second contactors controlled by said first relay means, a solenoid controlling said valve and connected in circuit with said first contactor so that closure of the latter by said first relay means energises the solenoid to open said valve, second relay means connected in circuit with said second contactor so that closure of the latter by said first relay means energises the second relay means, a main contactor which is connected in said electrical power supply circuit and which is closed by said second relay means when the latter is energised, a voltage sensitive relay which is subjected to the welding voltage by the closure of said main contactor, a starter contactor operatively associated with said voltage sensitive relay and being closed thereby when the voltage sensitive relay is subjected to the open circuit welding voltage, a starter circuit in which said starter contactor is connected, said starter circuit superimposing a high frequency voltage on the open circuit welding voltage when the starter contactor is closed by said voltage sensitive relay, a "raise" circuit which is completed when said second relay means is energised and a welding arc has been struck for increasing the welding current supplied by said electrical power supply circuit to a predetermined value, a retaining circuit for maintaining the second relay means energised whilst the welding current remains above a predetermined minimum value, a "lower" circuit which is completed when said second relay means is maintained energised by said retaining circuit and said first relay means is de-energised, for reducing the welding current to said predetermined minimum value and timing means operatively associated with said first and second contactors and serving to ensure that said second contactor closes after said first contactor when said first relay means is energised, and that said first contactor closes after said second contactor and after the welding current has been reduced to said predetermined minimum value, when said first relay means is de-energised.

3. A gas shielded arc welding apparatus comprising an electrical power supply circuit adapted to supply a welding current at least one gas supply conduit for feeding gas to the vicinity of a weld, a valve in said conduit controlling the flow of gas therethrough, first relay means, first and second contactors controlled by said first relay means, a solenoid controlling said valve and connected in circuit with said first contactor so that closure of the latter by said first relay means energises the solenoid to open said valve, second relay means connected in circuit with said second contactor so that closure of the latter by said first relay means energises the second relay means, a main contactor which is connected in said electrical power supply circuit and which is closed by said second relay means when the latter is energised, a voltage sensitive relay which is subjected to the welding voltage by the closure of said main contactor, a starter contactor operatively associated with said voltage sensitive relay and being closed thereby when the voltage sensitive relay is subjected to the open circuit welding voltage, a starter circuit in which said starter contactor is connected, said starter circuit superimposing a high frequency voltage on the open circuit welding voltage when the starter contactor is closed by said voltage sensitive relay, a "raise" contactor operatively associated with said voltage sensitive relay and being closed thereby when the voltage sensitive relay is subjected to the open circuit welding voltage, a "raise circuit" in which said "raise" contactor is connected, said "raise" circuit increasing the welding current supplied by said electrical power supply circuit to a predetermined value when said "raise" contactor is closed by the voltage sensitive relay, a retaining circuit for maintaining the second relay means energised whilst the welding current remains above a predetermined minimum value, a "lower" circuit which is completed when said second relay means is maintained energised by said retaining circuit and said first relay means is de-energised, for reducing the welding current to said predetermined minimum value, and timing means operatively associated with said first and second contactors and serving to ensure that said second contactor closes after said first contactor when said first relay means is energised, and that said first contactor closes after said second contactor and after the welding current has been reduced to said predetermined minimum value, when said first relay means is de-energised.

4. A gas shielded arc welding apparatus comprising an electrical power supply circuit adapted to supply a welding current, at least one gas supply conduit for feeding gas to the vicinity of a weld, a valve in said conduit controlling the flow of gas therethrough, first relay means, first and second contactors controlled by said first relay means, a solenoid controlling said valve and connected in circuit with said first contactor so that closure of the latter by said first relay means energises the solenoid to open said valve, second relay means connected in circuit with said second contactor so that closure of the latter by said first relay means energises the second relay means, a main contactor which is connected in said electrical power supply circuit and which is closed by said second relay means when the latter is energised, a variable resistance controlling the magnitude of the welding current, a D.C. electric motor for adjusting said variable resistance, a D.C. power supply circuit for said motor, a "raise" circuit which is completed when said second relay means is energised and a welding arc has been struck, whereby said "raise" circuit effects a connection between said D.C. power supply circuit and said motor to energise the latter and adjust the variable resistance so that the welding current is smoothly increased to a predetermined value, a retaining circuit for retaining the second relay means energised whilst the welding current remains above a predetermined minimum value, a "lower" circuit which is completed when second relay means is maintained energised by said retaining circuit, and said first relay means is de-energised, whereby said "lower" circuit effects a connection between said D.C. power supply circuit and said motor to energise the latter and adjust the variable resistance so that the welding current is smoothly decreased to said predetermined minimum value, and timing means operatively associated with said first and second contactors and serving to ensure that said second contactor opens after said first contactor when said first relay means is energised, and that said first contactor closes after said second contactor and after the welding current has been reduced to said predetermined minimum value, when said first relay means is de-energised.

5. A gas shielded arc welding apparatus as claimed in claim 4 in which said electrical power supply circuit includes a magnetic amplifier, said variable resistance being connected to said magnetic amplifier and controlling the operation thereof, and hence the magnitude of the welding current, in accordance with the magnitude of said variable resistance.

References Cited in the file of this patent

UNITED STATES PATENTS

| | | |
|---|---|---|
| 2,152,785 | Blankenbuehler | Apr. 4, 1939 |
| 2,351,083 | Tyrner | June 13, 1944 |
| 2,510,207 | Behnke et al. | June 6, 1950 |
| 2,510,415 | Pitcher | June 6, 1950 |
| 2,517,739 | Tyrner et al. | Aug. 8, 1950 |
| 2,760,044 | Mott | Aug. 20, 1956 |
| 2,843,727 | Benz et al. | July 15, 1958 |
| 2,867,730 | Welch | Jan. 6, 1959 |
| 2,910,572 | Diehl | Oct. 27, 1959 |